United States Patent Office 3,489,721
Patented Jan. 13, 1970

3,489,721
PROCESS FOR PREPARING POLYESTERS WITH CADMIUM, LEAD, ZINC, OR MANGANESE-HYDROXIDE AS A TRANSESTERIFICATION CATALYST
John A. Price, Swarthmore, and Mary J. Stewart, Media, Pa., assignors to FMC Corporation, Philadelphia, Pa., a corporation of Delaware
No Drawing. Filed June 1, 1967, Ser. No. 642,724
Int. Cl. C08g 17/06
U.S. Cl. 260—75
8 Claims

ABSTRACT OF THE DISCLOSURE

Process of preparing polyester resins comprising carrying out an ester-interchange reaction between a suitable diol and an ester of a dicarboxylic acid in the presence of a hydroxide transesterification catalyst selected from the group consisting of cadmium hydroxide, lead hydroxide, zinc hydroxide, and manganese hydroxide.

---

This invention relates to a method of preparing linear polyesters from a suitable diol and an ester of a dicarboxylic acid. More particularly, it relates to an improved method for preparing polyethylene terephthalate through the use of an improved transesterification catalyst.

The manufacture of polyester resin from a dialkyl terephthalate and diol is well known in the art. In the preparation of such polyesters, the dialkyl terephthalate and diol are first combined and subjected to an ester-interchange or transesterification reaction in the presence of an ester-interchange catalyst at elevated temperature and atmospheric pressure. The resulting product or prepolymer is then polycondensed at higher temperatures and under reduced pressure in the presence of a polycondensation catalyst to form the desired polyester resin product.

Polyethylene terephthalate suitable for melt spinning into filaments should have a carboxyl content value of about or below 50 equivalents per million grams (eq./$10^6$ gr. or meq./kg.), a melting point of at least about 258–260° C., and an intrinsic viscosity preferably not less than about 0.60, as determined in a 60% phenol and 40% tetrachloroethane solution, wt./wt., at 30° C.

From a commercial standpoint, it is essential that the polyester resin be produced in the shortest possible time and the desired degree of polymerization be obtained. One way of evaluating the effectiveness of a transesterification or ester-interchange catalyst in the preparation of polyethylene terephthalate from dimethyl terephthalate and ethylene glycol is by measuring the half-time of the catalyst. The "half-time" is defined as the time necessary for the first one-half of the theoretical amount of methyl alcohol that will be produced during the esterification reaction to distill from the transesterification reaction mixture. It is desirable that the half-time be as short as possible, preferably less than 60 minutes; however, it is essential that the transesterification catalyst, in any case, act to produce a polyester prepolymer suitable for polycondensation to a high molecular weight linear polyester.

It is an object of this invention to provide a method of preparing high molecular weight linear polyesters.

Another object of the present invention is to provide an improved method for accelerating the transesterification reaction between ethylene glycol and dimethyl terephthalate in the preparation of polyethylene terephthalate.

These and other objects are accomplished in the present invention, which involves a method of preparing polyethylene terephthalate resin wherein dimethyl terephthalate and ethylene glycol are transesterified and the resulting transesterified product is polycondensed in the presence of a polycondensation catalyst, the improvement comprising carrying out said transesterification reaction in the presence of a metal hydroxide selected from the group consisting of cadmium hydroxide, lead hydroxide, zinc hydroxide, and manganese hydroxide, or any combination thereof.

Concentrations of the present transesterification catalyst in the range of from about 0.01% to about 0.2%, based on the weight of dimethyl terephthalate in the subject dimethyl-ethylene glycol reaction mixture is used. Usually, it has been found that from about 0.02% to about 0.10% of the present hydroxide catalysts, based on the weight of the dimethyl terephthalate in the reaction mixture, is preferred to produce linear polyester resins suitable for forming filaments. Higher or lower concentrations of the present catalysts can also be used. However, when concentrations less than the above are used, their catalytic effect is generally reduced, whereas when concentrations greater than this are used, no further improvement in the desired product is obtained.

The preparation of linear polyesters of the present invention via the ester-interchange reaction is carried out with a molar ratio of diol to dialkyl terephthalate of from about 1:1 to about 15:1, but preferably from about 1.2:1 to about 2.6:1. The ester-interchange reaction is generally carried out at atmospheric pressure in an inert atmosphere such as nitrogen, initially at a temperature range of from about 125° C. to about 250° C., but preferably between about 150° C. and 200° C. in the presence of an ester-interchange catalyst. During this first stage, methyl alcohol is evolved and is continuously removed by distillation. After a reaction period of about 2 to 3 hours, the temperature of the reaction mixture is raised to about from 200° C. to about 300° C. for approximately one-half to two hours in order to complete the reaction and distill off excess glycol. The main product of the transesterification reaction is the prepolymer, which is comprised principally of bis(2-hydroxyethyl)terephthalate.

The second stage or polycondensation step of the present method is generally achieved under reduced pressure within the range of from about 0.05 to 20 mm. of mercury in the absence of an oxygen-containing gas at temperatures ranging from about 260° C. to about 325° C. for about two to six hours.

It is preferable to carry out both the first and second steps of the present method under agitation.

The polycondensation step of the present method is generally accomplished with the use of a suitable polycondensation catalyst, for example, antimony trioxide.

The polycondensation catalysts are generally employed in amounts ranging from about 0.005 to about 0.5%, based on the total weight of the prepolymer.

The following examples of several preferred embodiments will further serve to illustrate the present invention. All parts are by weight unless otherwise indicated.

EXAMPLE I

A mixture comprising 600 g. of dimethyl terephthalate, 396 ml. of ethylene glycol and 0.24 g. of cadmium hydroxide, $Cd(OH)_2$, were charged into a reaction vessel equipped with a nitrogen inlet, a vacuum source, distillation arm, heating means and stirring means. The reaction mixture was agitated and heated under atmospheric pressure to about 198° C. over a period of about 30 minutes, under a nitrogen blanket, whereby by-product methyl alcohol was distilled off. The reaction mixture was maintained at this temperature and under these conditions for about two hours. Then the temperature of the reaction mixture was allowed to rise in order to distill off any remaining by-product comprising methyl alcohol and glycol and form the polyester prepolymer. After about 30 minutes, the temperature had risen to about 230° C., at which time the formed polyester prepolymer was cooled under a nitrogen blanket. The half-time of the cadmium catalyst was 19 minutes.

EXAMPLE II

Fifty grams of the resulting prepolymer of Example I was combined with 0.02 gram of antimony trioxide in a reaction vessel equipped with a nitrogen inlet, a vacuum source, a distillation arm, stirring means and heating means. Pressure within the reaction vessel was reduced to from about 0.1 to about 0.05 mm. of mercury at 285° C. under a nitrogen blanket and the reaction mixture was agitated under these conditions for about two hours to bring about polycondensation of the prepolymer and formation of the polyester resin. The resin obtained had an intrinsic viscosity of 0.86, a melting point of about 267° C., and a carboxyl content value of 14 (meq./kg.).

EXAMPLE III

A mixture comprising 600 g. of dimethyl terephthalate, 396 ml. of ethylene glycol and 0.24 g. of lead hydroxide, $Pb(OH)_2$, were charged into a reaction vessel equipped with a nitrogen inlet, a vacuum source, distillation arm, heating means and stirring means. The reaction mixture was agitated and heated under atmospheric pressure to about 198° C. over a period of about 30 minutes, under a nitrogen blanket, whereby by-product methyl alcohol was distilled off. The reaction mixture was maintained at this temperature and under these conditions for about two hours. Then the temperature of the reaction mixture was allowed to rise in order to distill off any remaining by-product comprising methyl alcohol and glycol and form the polyester prepolymer. After about 30 minutes, the temperature had risen to about 230° C., at which time the formed polyester prepolymer was cooled under a nitrogen blanket. The half-time of the lead hydroxide catalyst was 23 minutes.

EXAMPLE IV

Fifty grams of the resulting prepolymer of Example III was combined with 0.02 gram of antimony trioxide in a reaction vessel equipped with a nitrogen inlet, a vacuum source, a distillation arm, stirring means and heating means. Pressure within the reaction vessel was reduced to from about 0.1 to about 0.05 mm. of mercury at 285° C. under a nitrogen blanket and the reaction mixture was agitated under these conditions for about two hours to bring about polycondensation of the prepolymer and formation of the polyester resin. The resin obtained had an intrinsic viscosity of 0.86, a carboxyl content value of 12 (meq./kg.) and a melting point of about 268° C.

EXAMPLE V

A mixture comprising 600 g. of dimethyl terephthalate, 396 ml. of ethylene glycol and 0.24 g. of zinc hydroxide, $Zn(OH)_2$, was charged into a reaction vessel equipped with a nitrogen inlet, a vacuum source, distillation arm, heating means and stirring means. The reaction mixture was agitated and heated under atmospheric pressure to about 198° C. over a period of about 30 minutes, under a nitrogen blanket, whereby by-product methyl alcohol was distilled off. The reaction mixture was maintained at this temperature and under these conditions for about two hours. Then the temperature of the reaction mixture was allowed to rise in order to distill off any remaining by-product comprising methyl alcohol and glycol and form the polyester prepolymer. After about 30 minutes, the temperature had risen to about 230° C., at which time the formed polyester prepolymer was cooled under a nitrogen blanket. The half-time of the zinc hydroxide catalyst was 22 minutes.

EXAMPLE VI

Fifty grams of the resulting prepolymer of Example V was combined with 0.02 gram of antimony trioxide in a reaction vessel equipped with a nitrogen inlet, a vacuum source, a distillation arm, stirring means and heating means. Pressure within the reaction vessel was reduced to from about 0.1 to about 0.05 mm. of mercury at 285° C. under a nitrogen blanket and the reaction mixture was agitated under these conditions for about two hours to bring about polycondensation of the prepolymer and formation of the polyester resin. The resin obtained had an intrinsic viscosity of 0.92, a melting point of about 266° C., and a carboxyl content value of 35 (meq./kg.).

EXAMPLE VII

A mixture comprising 600 g. of dimethyl terephthalate, 396 ml. of ethylene glycol and 0.24 g. of manganese hydroxide, $MnO(OH)$, was charged into a reaction vessel equipped with a nitrogen inlet, a vacuum source, distillation arm, heating means and stirring means. The reaction mixture was agitated and heated under atmospheric pressure to about 198° C. over a period of about 30 minutes, under a nitrogen blanket, whereby by-product methyl alcohol was distilled off. The reaction mixture was maintained at this temperature and under these conditions for about two hours. Then the temperature of the reaction mixture was allowed to rise in order to distill off any remaining by-product comprising methyl alcohol and glycol and form the polyester prepolymer. After about 30 minutes, the temperature had risen to about 230° C., at which time the formed polyester prepolymer was cooled under a nitrogen blanket. The half-time of the manganese hydroxide catalyst was 14 minutes.

EXAMPLE VIII

Fifty grams of the resulting prepolymer of Example VII was combined with 0.02 gram of antimony trioxide in a reaction vessel equipped with a nitrogen inlet, a vacuum source, a distillation arm, stirring means and heating means. Pressure within the reaction vessel was reduced to from about 0.1 to about 0.05 mm. of mercury at 285° C. under a nitrogen blanket and the reaction mixture was agitated under these conditions for about two hours to bring about polycondensation of the prepolymer and formation of the polyester resin. The resin obtained had an intrinsic viscosity of 0.64, a carboxyl content value of 19 (meq./kg.) and a melting point of about 265° C.

The intrinsic viscosities of the polyester products of the above examples were determined in a 60% phenol and 40% tetrachloroethane solution, wt./wt., at 30° C. The other analytical values of the prepolymer and resin products were determined through the use of conventional quantitative laboratory procedures.

The above examples indicate that the presence of a suitable metal hydroxide during the transesterification step of the present process facilitates the preparation of the polyester prepolymer and, in turn, the resulting polyester resin product. Through the use of the present method, the ester-interchange reaction is greatly accelerated, as indicated by the low half-times of the ester-interchange catalysts, and a prepolymer is formed which is suitable for polycondensation into a highly polymeric polyester.

The polyester products formed in these examples have high molecular weights, as indicated by their intrinsic viscosities, high melting points and low carboxyl content values so as to make them particularly valuable in the preparation of high quality polyester filaments.

While the process of the present invention has been described with particular reference to polyethylene terephthalate, it may be obvious that the present invention also includes within its scope the preparation of other similar polymeric polymethylene terephthalates. For example, it includes within its scope the preparation of other polymeric polymethylene terephthalates formed from glycols of the series $HO(CH_2)_nOH$, wherein $n$ is 2 to 10 and various dialkyl esters of terephthalic acid and copolyesters formed from combinations with other esters of suitable dicarboxylic acids such as isophthalic acid.

We claim:
1. In a process of preparing highly polymeric polyester resin wherein a dialkyl terephthalate and a glycol having the formula $HO(CH_2)_nOH$, wherein $n$ is 2 to 10, are transesterified and the resulting transesterified product is polycondensed in the presence of a polycondensation catalyst, the improvement comprising carrying out the said transesterification in the presence of a catalytic amount of a transesterification catalyst selected from the group consisting of cadmium hydroxide, lead hydroxide, zinc hydroxide, and manganese hydroxide.
2. The process of claim 1 wherein the diol is ethylene glycol.
3. The process of claim 1 wherein the dialkyl terephthalate is dimethyl terephthalate.
4. The process of claim 1 wherein the catalyst is present in an amount of from about 0.01% to about 0.20%, based on the weight of the dimethyl terephthalate in the reaction mixture.
5. The process of claim 1 wherein the catalyst is cadmium hydroxide.
6. The process of claim 1 wherein the catalyst is lead hydroxide.
7. The process of claim 1 wherein the catalyst is zinc hydroxide.
8. The process of claim 1 wherein the catalyst is manganese hydroxide.

References Cited

UNITED STATES PATENTS 2,921,051   1/1960   Amborski et al. _____ 260—75

FOREIGN PATENTS 1,456,345   9/1966   France.

WILLIAM H. SHORT, Primary Examiner

LOUISE P. QUAST, Assistant Examiner

U.S. Cl. X.R.

260—475